United States Patent
Tada

[11] Patent Number: 5,861,999
[45] Date of Patent: Jan. 19, 1999

[54] SUPER WIDE ANGEL LENS SYSTEM USING AN ASPHERICAL LENS

[75] Inventor: Eijiroh Tada, Tokyo, Japan

[73] Assignee: Asahi Seimitsu Kabushiki Kaisha, Tokyo, Japan

[21] Appl. No.: 915,603

[22] Filed: Aug. 21, 1997

[30] Foreign Application Priority Data

Aug. 23, 1996 [JP] Japan .................................. 8-222394
Jul. 28, 1997 [JP] Japan .................................. 9-201903

[51] Int. Cl.$^6$ ........................... G02B 13/04; G02B 13/18
[52] U.S. Cl. ........................ 359/752; 359/713; 359/753
[58] Field of Search .................................. 359/749, 750, 359/751, 752, 753, 708, 713

[56] References Cited

U.S. PATENT DOCUMENTS

| | | | |
|---|---|---|---|
| 3,506,339 | 4/1970 | Kazamaki | 359/751 |
| 3,856,385 | 12/1974 | Takahashi | 359/751 |
| 4,952,040 | 8/1990 | Igarashi | 359/708 |
| 4,957,355 | 9/1990 | Sato | 359/749 |
| 5,477,388 | 12/1995 | Ishiyama et al. | 359/751 |

*Primary Examiner*—Scott J. Sugarman
*Attorney, Agent, or Firm*—Greenblum & Bernstein, P.L.C.

[57] ABSTRACT

A retrofocus type super wide angle lens system includes a front lens group of negative power and a rear lens group of positive power, arranged in this order from the object side. The front lens group consists of a negative meniscus first lens element with a convex surface facing the object side and a second lens element having at least one aspherical surface, arranged in this order from the object side. The aspherical second lens element is shaped such that it forms a biconcave lens in the vicinity of the optical axis and forms a negative meniscus lens with a convex surface located on the object side at a peripheral portion thereof.

10 Claims, 9 Drawing Sheets

SPHERICAL ABERRATION

FIG. 3

ASTIGMATISM

FIG. 4

DISTORTION

SPHERICAL ABERRATION
CHROMATIC

FIG. 13

ASTIGMATISM

FIG. 14

DISTORTION

SPHERICAL
ABERRATION
CHROMATIC

FIG. 18

ASTIGMATISM

FIG. 19

DISTORTION

SUPER WIDE ANGLE LENS SYSTEM USING AN ASPHERICAL LENS

BACKGROUND OF THE INVENTION

1. Field of the Invention

The present invention relates to a super wide angle lens system which can be used for a monitoring camera (CCTV) etc.

2. Description of the Related Art

In general, a super wide angle lens system is used as the lens system in a monitoring camera or the like, to view or monitor a wide angle range. In order to increase the back focal distance and widen the angle of view, a retrofocus type of super wide angle lens having a negative front lens group and a positive rear lens group is used. In such a retrofocus type, the angle of view can be widened by increasing the negative power of the front lens group. To this end, a plurality of negative lens elements of the rear lens group share the negative power. Generally, the negative lens elements consist of a negative meniscus first lens element with a convex surface facing the object side and a negative second lens element. The meniscus lens can advantageously reduce, due to the shape thereof, the astigmatism and distortion of a bundle of light chiefly at a large angle of view. It is mainly for this reason that the meniscus lens has been used as the negative first lens element of the front lens group.

In a super wide angle lens system having an angle of view in the range of 120° to 140° and in which the front lens group consists of a negative meniscus first lens element and a negative second lens element, the radius of curvature of a second concave surface (surface on the image side) of the negative meniscus first lens element is reduced (i.e., the depth of the concave surface is increased). However, this makes it very difficult to produce the meniscus lens. If the negative power of the second lens element is increased, the negative power of the first lens element is reduced. Consequently, the radius of curvature of the second surface of the first lens element is increased. However, if the second lens element is made of a biconcave lens to increase the negative power, an under curvature of field occurs. In order to solve this problem, upon design, consideration must be given to balance the negative power between the first lens element and the second lens element.

SUMMARY OF THE INVENTION

It is an object of the present invention to provide a retrofocus type super wide angle lens system in which an angle of view of approximately 120° to 140° and an F-number of approximately 1.2 to 1.4 can be obtained without increasing the radius of curvature of a second surface of a negative meniscus first lens element.

To achieve the object mentioned above, according to the present invention, there is provided a retrofocus type super wide angle lens system having a front lens group of negative power and a rear lens group of positive power, arranged in this order from the object side. The front lens group consists of a negative meniscus first lens element with a convex surface facing the object side and a second lens element having at least one aspherical surface, arranged in this order from the object side. The aspherical second lens element is shaped such that the second lens element forms a biconcave lens in the vicinity of the optical axis (for a bundle of rays at a small angle of view) and forms a negative meniscus lens with a convex surface facing the object side at the peripheral portion thereof (for a bundle of rays at a large angle of view).

The boundary portion between the biconcave lens portion of the aspherical second lens element in the vicinity of the optical axis and the peripheral negative meniscus lens portion thereof is, for example, located substantially on the peripheral portion of the axial bundle defined by the F-number.

Preferably, the surface of the second lens element located on the object side is made of an aspherical surface and preferably satisfies the following conditions:

$$-12 \leq R_3/f \leq -6 \tag{1}$$

$$2.0 \times 10^{-2} \leq A_4/f^3 \leq 1.0 \times 10^{-1} \tag{2}$$

$$-3.0 \times 10^{-2} \leq A_6/f^5 \leq -2.0 \times 10^{-3} \tag{3}$$

$$2.0 \times 10^{-4} \leq A_8/f^7 \leq 1.0 \times 10^{-2} \tag{4}$$

wherein $R_3$ represents a radius of curvature of the paraxial spherical surface of the aspherical surface of the second lens element, $A_4$ represents a fourth-order aspherical factor of the aspherical surface of the second lens element, $A_6$ represent a sixth-order aspherical factor of the aspherical surface of the second lens element, $A_8$ represents a eighth-order aspherical factor of the aspherical surface of the second lens element, f represents a focal length of the whole lens system.

The aspherical second lens element can be made entirely of a plastic mold, or can be made of a hybrid lens having a spherical glass lens to which an aspherical plastic layer is adhered.

The rear lens group can be made of various combinations of lenses. For instance, the rear lens group can consist of a positive single lens element, a diaphragm, and two pairs of cemented lenses, each respectively having a positive lens element and a negative lens element cemented thereto, arranged in this order from the object side. With this arrangement, not only can the divergent light emitted from the front lens group be effectively received by the rear lens group, but also longitudinal chromatic aberration and chromatic aberration of magnification can be compensated for by a simple structure.

The rear lens group can consist of a positive single third lens element, a diaphragm, a first cemented lens assembly having a negative fourth lens element and a positive fifth lens element cemented thereto, and a second cemented lens assembly having a negative sixth lens element and a positive seventh lens element cemented thereto, arranged in this order from the object side. The rear lens group preferably satisfies the following conditions:

$$2.50 \leq R_8/f \leq 3.10 \tag{5}$$

$$2.35 \leq R_{11}/f \leq 2.55 \tag{6}$$

$$14 \leq f_{7-9} \tag{7}$$

$$4 \leq f_{10-12} \leq 5 \tag{8}$$

wherein $R_8$ represents a radius of curvature of the surface on the image side of the fourth lens element, $R_{11}$ represents a radius of curvature of the surface on the image side of the sixth lens element, $f_{7-9}$ represents a resultant focal length of the fourth and fifth lens elements, $f_{10-12}$ represents a resultant focal length of the sixth and seventh lens elements.

In an embodiment of the present invention, the third lens element is made of a positive meniscus lens with a convex surface on the image side, the fourth lens element is made of a negative lens with a concave surface on the image side, the fifth lens element is made of a positive biconvex lens, the sixth lens element is made of a negative meniscus lens with a convex surface on the object side, and the seventh lens element is made of a positive biconvex lens.

The present disclosure relates to subject matter contained in Japanese Patent Application Nos. 08-222394 (filed on Aug. 23, 1996) and 09-201903 (filed on Jul. 28, 1997) which are expressly incorporated herein by reference in their entireties.

BRIEF DESCRIPTION OF THE DRAWINGS

The invention will be described below in detail with reference to the accompanying drawings, in which.

DESCRIPTION OF THE PREFERRED EMBODIMENTS

In a retrofocus type of super wide angle lens system according to the present invention, the negative first lens group consists of a negative meniscus first lens element having a convex surface facing the object side and a second lens element having at least one aspherical surface, arranged in this order from the object side. The shape of the aspherical second lens element is such that it serves as a biconcave lens in the vicinity of the optical axis (for a bundle of light at a small angle of view) and serves as a negative meniscus lens whose convex surface is located on the object side at the peripheral portion thereof (for a bundle of light at a large angle of view).

Namely, the aspherical second lens element basically functions as a biconcave lens having a negative power to reduce the negative power of the meniscus first lens element. However, if the negative power of the biconcave lens is increased, an under curvature of field occurs. To solve this problem, the aspherical second lens element forms at the peripheral portion thereof, a negative meniscus lens having its convex surface located on the object side. If the aspherical second lens element is made of a biaspherical lens, the aberrations can be easily compensated.

Figure 21:
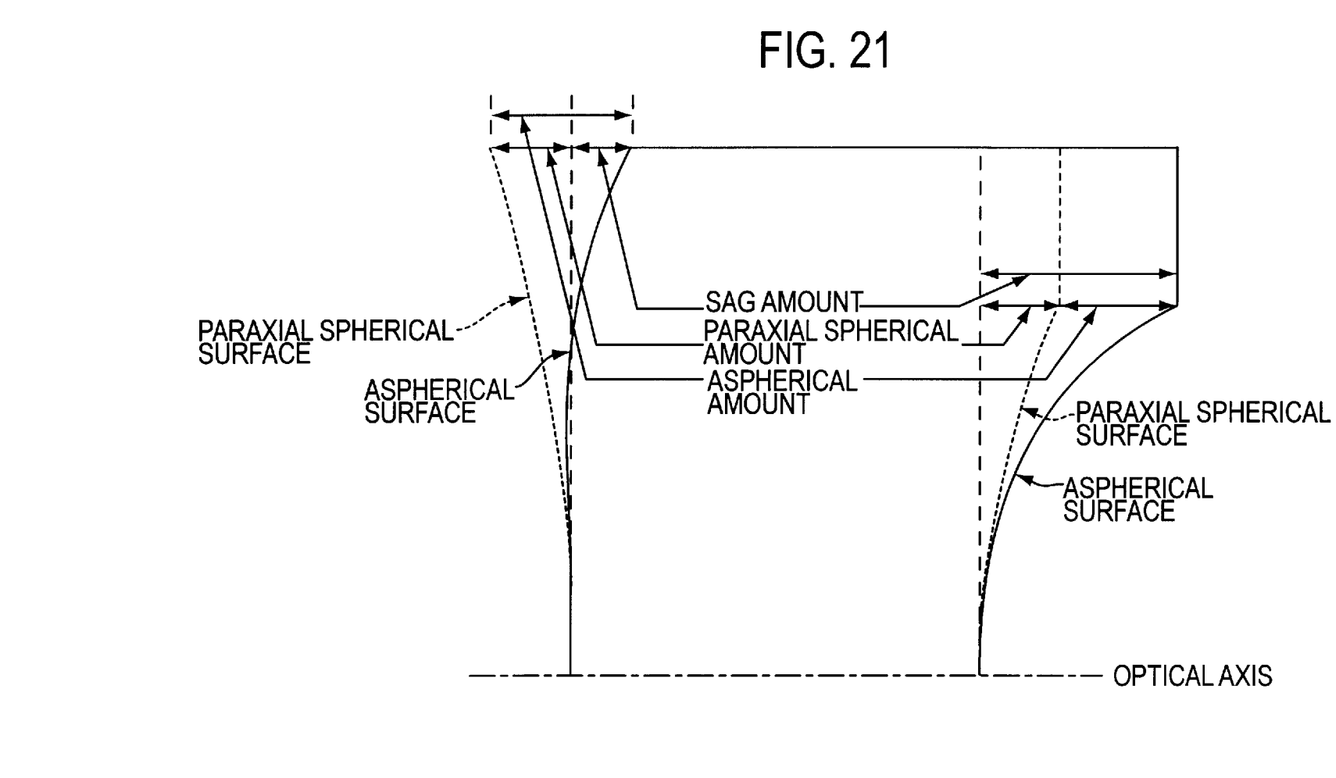
FIG. 21 shows a definition of the aspherical amount, etc., of an aspherical lens.

It is preferable that the boundary portion between the biconcave surface portion of the aspherical second lens element in the vicinity of the optical axis and the peripheral negative meniscus lens portion is located substantially on the peripheral portion of the axial bundle, determined by the F-number. If the central biconcave portion is smaller than the diameter of the peripheral portion of the axial bundle, the longitudinal spherical aberration and the chromatic aberration are adversely influenced and the aspherical aberration factor at the low-order term becomes large. Consequently, the change in the sag amount of the aspherical surface shown in FIG. 21 is too large to obtain the surface shape most appropriate to correct the off-axis aberrations. If the central biconcave portion is larger than the diameter of the peripheral portion of the axial bundle, the effective area of the negative meniscus lens element is reduced. Consequently, no effective aberration correction occurs.

Conditions (1) through (4) specify the conditions on the aspherical surface (third surface) of the second lens element on the object side. Condition (1) specifies the radius of curvature of the paraxial spherical surface of the third surface of the second lens element and the focal length of the whole optical system.

If the ratio defined in condition (1) is smaller than the lower limit, the radius of curvature is large and it becomes difficult to obtain sufficient back focal distance with respect to the focal length. If the ratio exceeds the upper limit, the radius of curvature is too small to correct the off-axis aberrations by the aspherical surface.

Condition (2) specifies the condition on the fourth-order aspherical factor of the aspherical surface. If the ratio defined in condition (2) is smaller than the lower limit, the astigmatism can not be sufficiently compensated. If the ratio defined in condition (2) exceeds the upper limit, the sag amount from the spherical (third) surface with respect to the F-number of the optical system (axial bundle) is so large that the spherical aberration is adversely influenced.

Consequently, a reduced performance of the center portion of the lens occurs.

Conditions (3) and (4) specify the condition on the sixth-order and eighth-order aspherical factors of the aspherical surface, respectively. If condition (3) or (4) is not satisfied, the astigmatism increases toward the peripheral portion of the lens when the angle of view is large.

Conditions (5) through (8) specify the conditions on the second lens group. Conditions (5) and (6) specify the radius of curvature of the surface (8-th surface) of the fourth lens element on the image side, the radius of curvature of the surface (11-th surface) of the sixth lens element on the image side, and the focal length of the whole lens system.

Conditions (7) and (8) specify the ratio of the resultant focal length of the fourth and fifth lens elements and the focal length of the whole lens system, and the ratio of the resultant focal length of the sixth and seventh lens elements and the focal length of the whole lens system, respectively.

If the ratio defined in condition (7) or (8) is larger than the upper limit, the focal length of the whole optical system is increased so that the angle of view for the same picture size can be reduced. If the ratio defined in the condition (7) or (8) is smaller than the lower limit, it becomes difficult to obtain sufficient back focal distance with respect to the focal length.

If conditions (7) and (8) are satisfied, but condition (5) is not satisfied, the spherical aberration and the longitudinal chromatic aberration are enhanced. Thus, the optical performance of the central portion of the image surface is deteriorated. If an attempt is made to correct these aberrations by other lens surfaces, off-axis aberration can not be sufficiently corrected.

If the ratio defined in condition (6) is smaller than the lower limit, an over correction of the chromatic aberration of magnification occurs, and the off-axis optical performance is deteriorated. If the ratio defined in condition (6) is larger than the upper limit, it is difficult to correct the spherical aberrations while satisfying condition (5).

Numerical examples of a super wide angle lens system of the present invention will be discussed below with reference to the attached drawings and the following tables.

In the following tables and diagrams the d-line, g-line and C-line represent the chromatic aberrations represented by spherical aberrations at the respective wavelengths, S designates the Sagittal rays, M designates the Meridional rays, FNo designates the F-number, f designates the focal length, W designates the half angle of view, fB designates the back focal distance, R designates the radius of curvature, D designates the distance between the lens surfaces, Nd designates the refractive index of the d-line, and vd designates the Abbe number of the d-line. The back focal distance refers to the reduced distance fB between surface No. 12 and No. 15.

The rotation symmetrical aspherical surface can be generally expressed as follows:

$$x = Ch^2 / \{1 + [1 - (1+K)C^2 h^2]^{1/2}\} + A4 h^4 + A6 h^6 + A8 h^8 + \ldots$$

wherein, h represents a height above the axis, x represents a distance from a tangent plane of an aspherical vertex, C represents a curvature of the aspherical vertex (1/r), K represents a conic constant, A4 represents a fourth-order aspherical factor, A6 represents a sixth-order aspherical factor, A8 represents an eighth-order aspherical factor, A10 represents a tenth-order aspherical factor.

<Embodiment 1>

Figure 1:
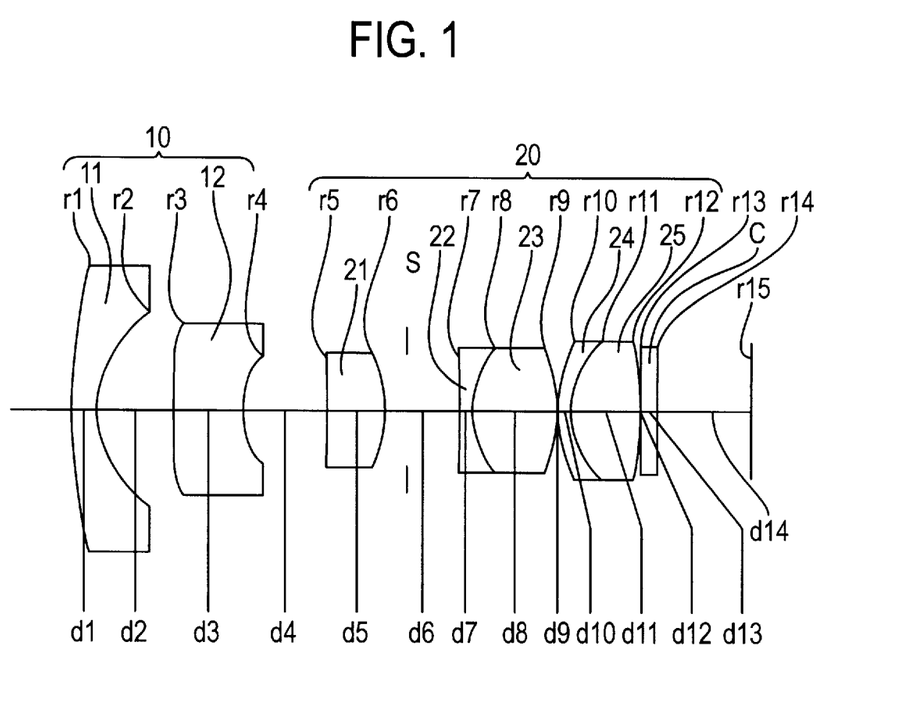
FIG. 1 is a schematic view showing the lens arrangement of a first embodiment of a super wide angle lens system, according to the present invention.
Figure 2:
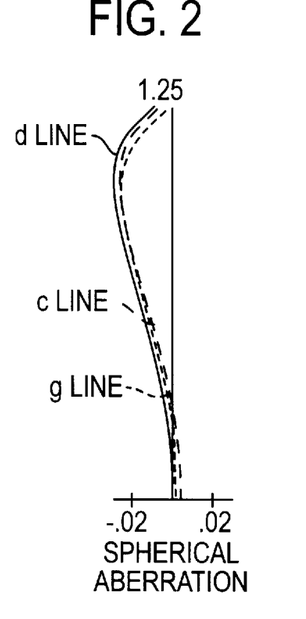
FIG. 2 shows diagrams of chromatic aberrations represented by spherical aberrations, in the super wide angle lens system shown in FIG. 1.
Figure 3:
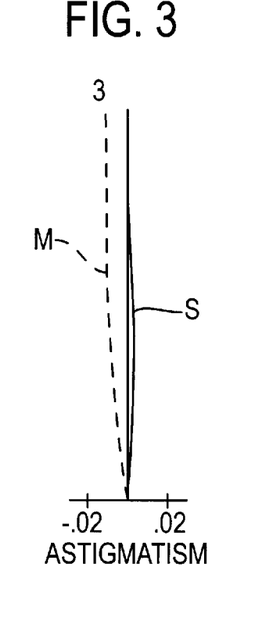
FIG. 3 shows astigmatism diagrams of the super wide angle lens system shown in FIG. 1.
Figure 4:
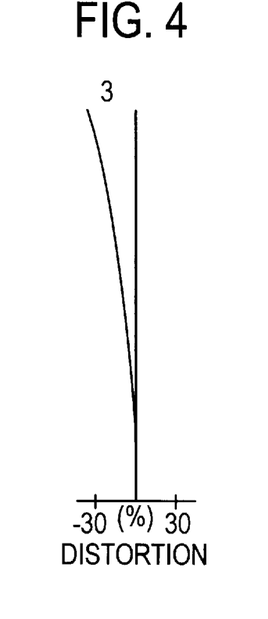
FIG. 4 shows distortion diagrams of the super wide angle lens system shown in FIG. 1.
Figure 5A:
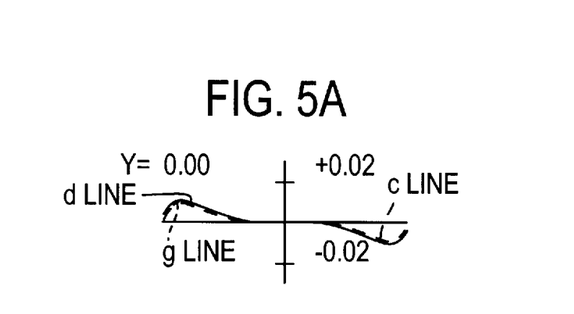
FIG. 5 shows coma diagrams of the super wide angle lens system shown in FIG. 1 at each angle of view.
Figure 5B:
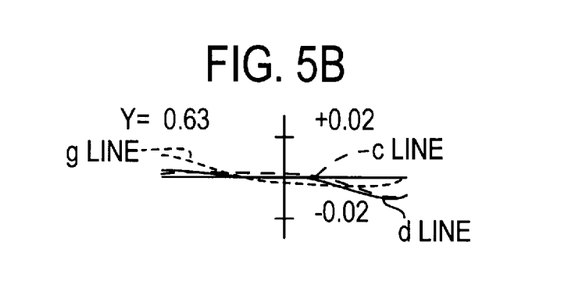
Figure 5C:
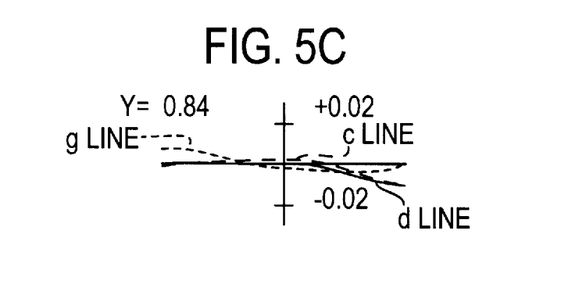
Figure 5D:
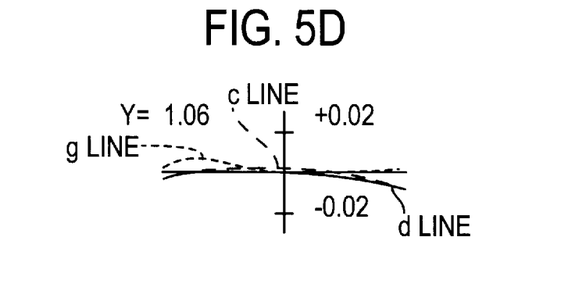

FIG. 1 shows a first embodiment of a super wide angle lens system according to the present invention. In this embodiment, the lens system consists of a front lens group 10 and a rear lens group 20, in this order from the object side (the left side as viewed in FIG. 1). The front lens group 10 consists of a first lens element 11 made of a negative meniscus lens having a convex surface on the object side and a second lens element 12 made of a biaspherical lens which forms a biconcave lens at the center portion thereof and forms a negative meniscus lens having a convex surface at the peripheral portion thereof. The first lens element 11 and the second lens element 12 are arranged in this order from the object side.

The rear lens group 20 consists of a third lens element 21 made of a positive meniscus lens having a convex surface on the image side, a first cemented lens assembly and a second cemented lens assembly. The first cemented lens assembly comprises a fourth lens element 22 of a biconcave lens and a fifth lens element 23 of a biconvex lens cemented thereto. The second cemented lens assembly comprises a sixth lens element 24 of a negative meniscus lens having a convex surface on the object side and a seventh lens element 25 of a biconvex lens cemented thereto. These lens elements are arranged in this order from the object side.

A diaphragm S is provided between the third lens element 21 and the fourth lens element 22. "C" designates a glass cover of the CCD.

Numerical data regarding the super wide angle lens system shown in FIG. 1 is shown in Table 1 below. The surface Nos. 13 and 14 correspond to the surfaces of the glass cover C. The surface No. 15 refers to the image pickup surface of the CCD.

FIGS. 2 through 5 show aberration diagrams of the lens system shown in FIG. 1.

TABLE 1

FNO = 1:1.3
f = 1.00
W = 58.9
fB = 2.70 (=0.422/1.51633 + 2.423)

| Surface No. | R | D | Nd | vd |
| --- | --- | --- | --- | --- |
| 1 | 16.361 | 0.634 | 1.77250 | 49.6 |
| 2 | 2.917 | 1.940 | — | — |
| 3* | −7.296 | 1.760 | 1.49176 | 57.4 |
| 4* | 3.887 | 2.204 | — | — |
| 5 | −15.840 | 1.436 | 1.84666 | 23.8 |
| 6 | −3.450 | 0.574 | — | — |
| diaphragm | ∞ | 1.338 | — | — |
| 7 | −29.920 | 0.317 | 1.84666 | 23.8 |
| 8 | 2.549 | 2.165 | 1.51633 | 64.1 |
| 9 | −3.963 | 0.035 | — | — |
| 10 | 4.186 | 0.317 | 1.84666 | 23.8 |
| 11 | 2.400 | 1.760 | 1.77250 | 49.6 |
| 12 | −8.712 | 0.000 | — | — |
| 13 | ∞ | 0.422 | 1.51633 | 64.1 |
| 14 | ∞ | 2.423 | — | — |
| 15 | ∞ | — | — | — |

*designates an aspherical surface with rotation symmetry around the optical axis.
Aspherical Data:
No.3: K = 0.00, A4 = 0.41500 × $10^{-1}$, A6 = −0.72169 × $10^{-2}$, A8 = 0.10529 × $10^{-2}$, A10 = 0.70513 × $10^{-4}$
No.4: K = 0.00, A4 = 0.78424 × $10^{-1}$, A6 = −0.13731 × $10^{-1}$, A8 = 0.11514 × $10^{-1}$, A10 = −0.22907 × $10^{-2}$ The aspherical surface No. 3 of the second lens element 12 makes it possible to serve as a biconcave lens at the center portion thereof and as a negative meniscus lens having a convex surface on the object side at the peripheral portion thereof. The shape, paraxial spherical amount and aspherical amount (amount of spherical deviation) of surface No. 3 are shown in Table 2 below. The definition of the aspherical amount, etc., can be seen in FIG. 21.

TABLE 2

| Distance from optical axis | Surface figure | Paraxial spherical amount | Aspherical amount |
|---|---|---|---|
| 0.00000 | 0.000000 | 0.000000 | 0.000000 |
| 0.10000 | −0.000681 | −0.000685 | 0.000004 |
| 0.20000 | −0.002676 | −0.002742 | 0.000066 |
| 0.30000 | −0.005839 | −0.006170 | 0.000331 |
| 0.40000 | −0.009940 | −0.010973 | 0.001034 |
| 0.50000 | −0.014668 | −0.017153 | 0.002485 |
| 0.60000 | −0.019654 | −0.024713 | 0.005059 |
| 0.70000 | −0.024484 | −0.033658 | 0.009174 |
| 0.80000 | −0.028717 | −0.043992 | 0.015276 |
| 0.90000 | −0.031901 | −0.055723 | 0.023822 |
| 1.00000 | −0.033590 | −0.068856 | 0.035266 |
| 1.10000 | −0.033349 | −0.083399 | 0.050049 |
| 1.20000 | −0.030765 | −0.099361 | 0.068596 |
| 1.30000 | −0.025440 | −0.116751 | 0.091311 |
| 1.40000 | −0.016994 | −0.135580 | 0.118586 |
| 1.50000 | −0.005050 | −0.155859 | 0.150809 |
| 1.60000 | 0.010765 | −0.177600 | 0.188365 |
| 1.70000 | 0.030831 | −0.200817 | 0.231648 |
| 1.80000 | 0.055518 | −0.225525 | 0.281043 |
| 1.90000 | 0.085160 | −0.251739 | 0.336898 |
| 2.00000 | 0.119985 | −0.279476 | 0.399460 |
| 2.10000 | 0.160005 | −0.308753 | 0.468759 |
| 2.20000 | 0.204833 | −0.339592 | 0.544425 |

The inflection points in the Sagittal direction and the Meridional direction can be obtained by linear and second-order differentials of the surface figure (shape) shown in Table 2, respectively.

<Embodiment 2>

Figure 6:
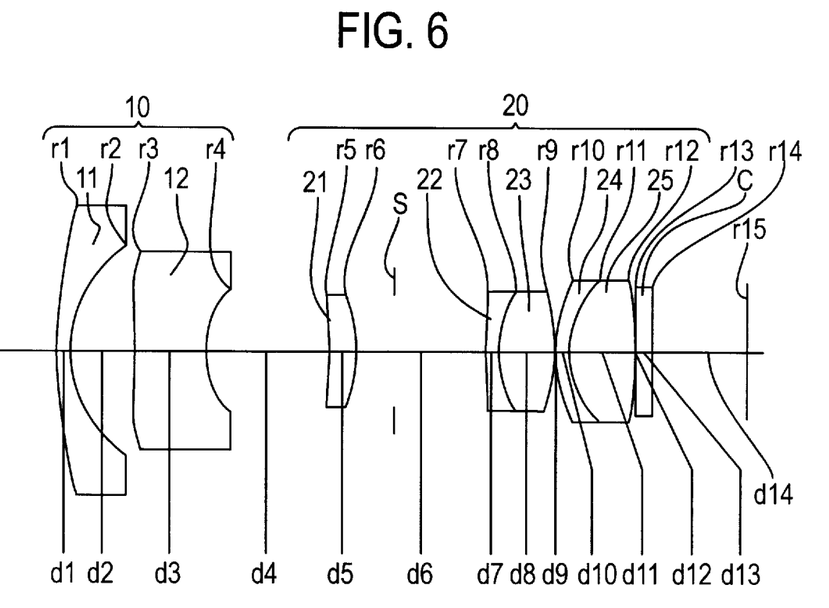
FIG. 6 is a schematic view showing the lens arrangement of a second embodiment of a super wide angle lens system, according to the present invention.
Figure 7:
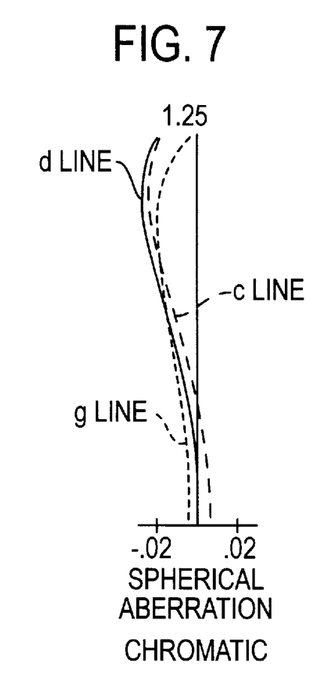
FIG. 7 shows diagrams of chromatic aberrations represented by spherical aberrations, in the super wide angle lens system shown in FIG. 6.
Figure 8:
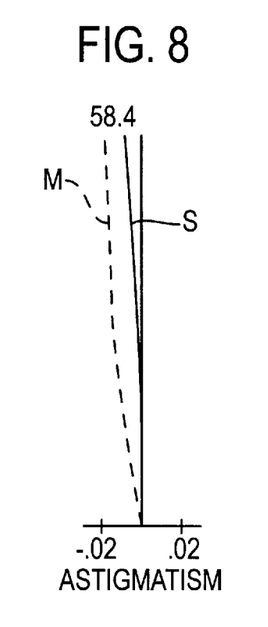
FIG. 8 shows astigmatism diagrams of the super wide angle lens system shown in FIG. 6.
Figure 9:
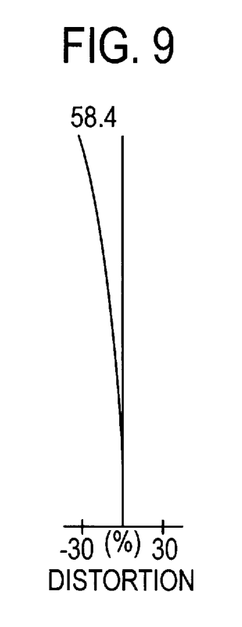
FIG. 9 shows distortion diagrams of the super wide angle lens system shown in FIG. 6.
Figure 10A:
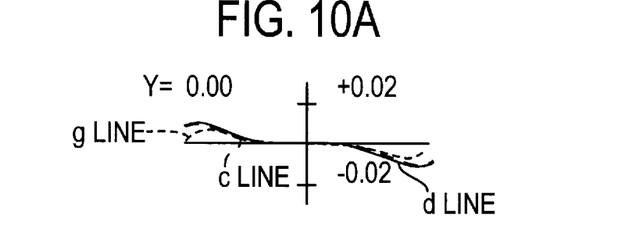
FIG. 10 shows coma diagrams of the super wide angle lens system shown in FIG. 6 at each angle of view.
Figure 10B:
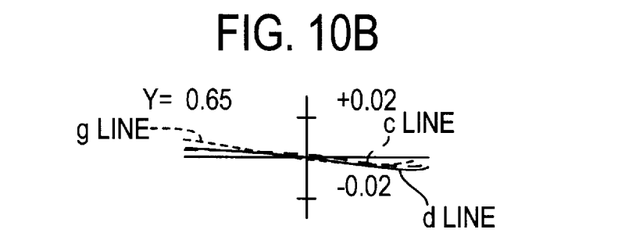
Figure 10C:
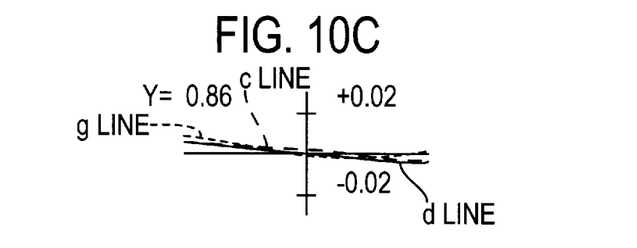
Figure 10D:
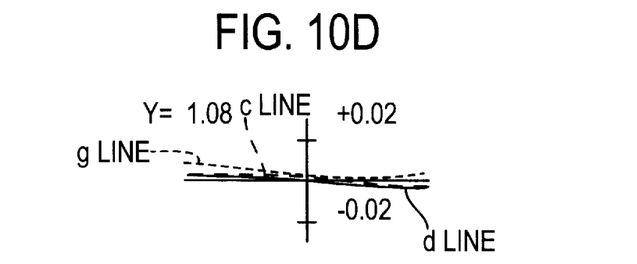

FIG. 6 shows a second embodiment of a super wide angle lens system according to the present invention. The basic structure of the lens system of the second embodiment is substantially the same as that of the first embodiment except that the fourth lens element 22 of the second lens group 20 is made of a negative meniscus lens having a convex surface on the object side. Numerical data regarding the second embodiment is shown in Table 3 below. The surface figure, paraxial spherical amount and aspherical amount of surface No. 3 are shown in Table 4 below. FIGS. 7 through 10 show aberration diagrams of the lens system of the second embodiment.

TABLE 3

FNO = 1:1.3
f = 1.00
W = 58.4
fB = 2.75 (=0.432/1.51633 + 2.467)

| Surface No. | R | D | Nd | νd |
|---|---|---|---|---|
| 1 | 13.592 | 0.360 | 1.77250 | 49.6 |
| 2 | 3.238 | 1.619 | — | — |
| 3* | −6.981 | 1.799 | 1.49176 | 57.4 |
| 4* | 3.485 | 3.231 | — | — |
| 5 | −11.389 | 0.648 | 1.84666 | 23.8 |
| 6 | −4.026 | 0.980 | — | — |
| diaphragm | ∞ | 2.319 | — | — |
| 7 | 17.988 | 0.324 | 1.84666 | 23.8 |
| 8 | 2.907 | 1.439 | 1.51633 | 64.1 |
| 9 | −5.170 | 0.036 | — | — |
| 10 | 4.050 | 0.324 | 1.84666 | 23.8 |

TABLE 3-continued

FNO = 1:1.3
f = 1.00
W = 58.4
fB = 2.75 (=0.432/1.51633 + 2.467)

| Surface No. | R | D | Nd | νd |
|---|---|---|---|---|
| 11 | 2.479 | 1.691 | 1.77250 | 49.6 |
| 12 | −10.343 | 0.000 | — | — |
| 13 | ∞ | 0.432 | 1.51633 | 64.1 |
| 14 | ∞ | 2.467 | — | — |
| 15 | ∞ | — | — | — |

*designates an aspherical surface with rotation symmetry around the optical axis.

Aspherical Data:
No.3: $K = 0.00$, $A4 = 0.30330 \times 10^{-1}$, $A6 = -0.43125 \times 10^{-2}$, $A8 = 0.46329 \times 10^{-3}$, $A10 = -0.24092 \times 10^{-4}$
No.4: $K = 0.00$, $A4 = 0.50708 \times 10^{-1}$, $A6 = -0.52255 \times 10^{-2}$, $A8 = 0.34087 \times 10^{-2}$, $A10 = -0.73846 \times 10^{-3}$

TABLE 4

| Distance from optical axis | Surface figure | Paraxial spherical amount | Aspherical amount |
|---|---|---|---|
| 0.00000 | 0.000000 | 0.000000 | 0.000000 |
| 0.10000 | −0.000713 | −0.000716 | 0.000003 |
| 0.20000 | −0.002817 | −0.002866 | 0.000048 |
| 0.30000 | −0.006206 | −0.006449 | 0.000243 |
| 0.40000 | −0.010710 | −0.011469 | 0.000759 |
| 0.50000 | −0.016099 | −0.017929 | 0.001830 |
| 0.60000 | −0.022096 | −0.025832 | 0.003737 |
| 0.70000 | −0.028385 | −0.035184 | 0.006799 |
| 0.80000 | −0.034629 | −0.045990 | 0.011362 |
| 0.90000 | −0.040475 | −0.058258 | 0.017783 |
| 1.00000 | −0.045575 | −0.071994 | 0.026420 |
| 1.10000 | −0.049591 | −0.087209 | 0.037617 |
| 1.20000 | −0.052212 | −0.103910 | 0.051699 |
| 1.30000 | −0.053156 | −0.122111 | 0.068955 |
| 1.40000 | −0.052183 | −0.141822 | 0.089639 |
| 1.50000 | −0.049096 | −0.163056 | 0.113960 |
| 1.60000 | −0.043749 | −0.185828 | 0.142079 |
| 1.70000 | −0.036047 | −0.210154 | 0.174107 |
| 1.80000 | −0.025958 | −0.236049 | 0.210092 |
| 1.90000 | −0.013523 | −0.263533 | 0.250010 |
| 2.00000 | 0.001122 | −0.292625 | 0.293747 |
| 2.10000 | 0.017709 | −0.323346 | 0.341055 |
| 2.20000 | 0.035789 | −0.355718 | 0.391507 |
| 2.30000 | 0.054639 | −0.389766 | 0.444405 |
| 2.40000 | 0.073154 | −0.425517 | 0.498671 |
| 2.50000 | 0.089673 | −0.462997 | 0.552670 |

<Embodiment 3>

Figure 11:
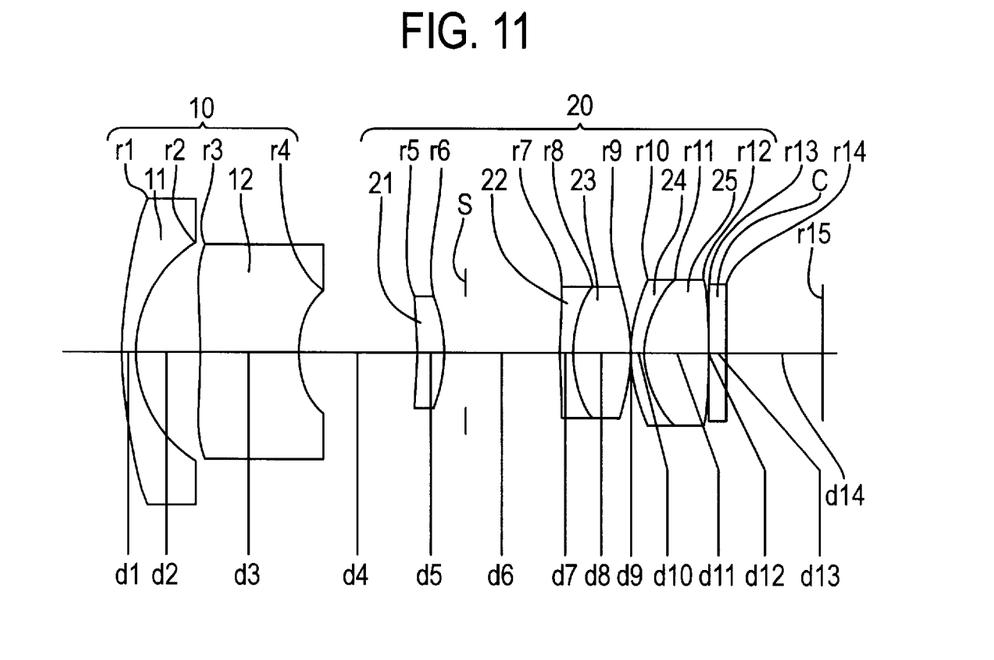
FIG. 11 is a schematic view showing the lens arrangement of a third embodiment of a super wide angle lens system, according to the present invention.
Figure 12:
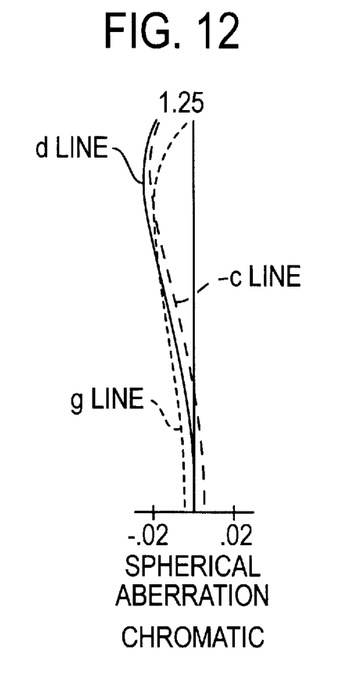
FIG. 12 shows diagrams of chromatic aberrations represented by spherical aberrations, in the super wide angle lens system shown in FIG. 11.
Figure 13:
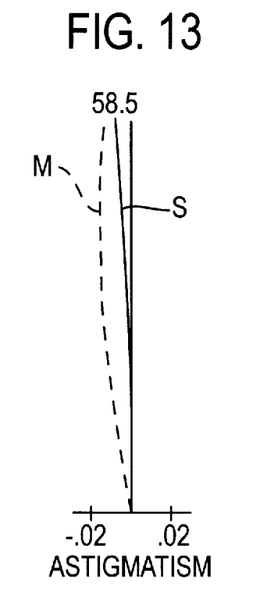
FIG. 13 shows astigmatism diagrams of the super wide angle lens system shown in FIG. 11.
Figure 14:
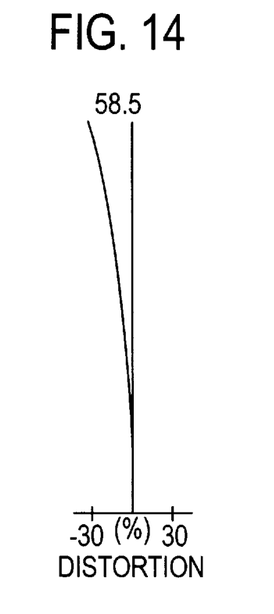
FIG. 14 shows distortion diagrams of the super wide angle lens system shown in FIG. 11.
Figure 15A:
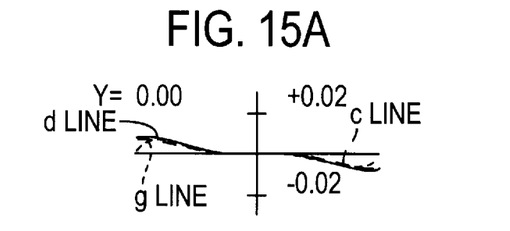
FIG. 15 shows coma diagrams of the super wide angle lens system shown in FIG. 11 at each angle of view.
Figure 15B:
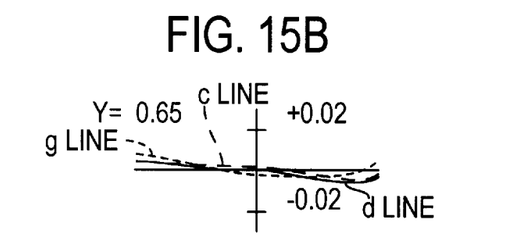
Figure 15C:
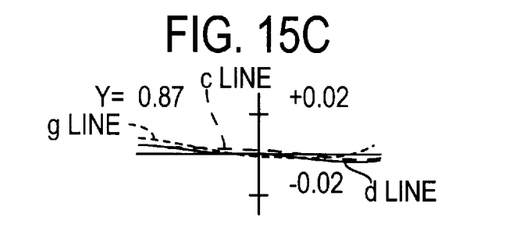
Figure 15D:
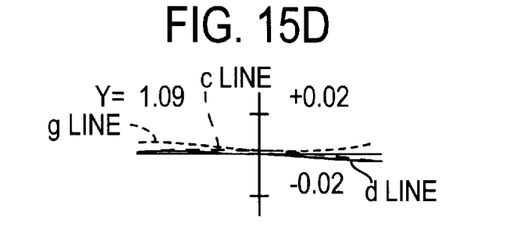

FIG. 11 shows a third embodiment of a super wide angle lens system according to the present invention. The basic structure of the lens system of the third embodiment is substantially the same as that of the second embodiment. Numerical data regarding the third embodiment is shown in Table 5 below. The surface figure, paraxial spherical amount and aspherical amount of surface No. 3 are shown in Table 6 below. FIGS. 12 through 15 show aberration diagrams of the lens system of the third embodiment.

TABLE 5

FNO = 1:1.3
f = 1.00
W = 58.5
fB = 2.79 (=0.437/1.51633 + 2.501)

| Surface No. | R | D | Nd | vd |
|---|---|---|---|---|
| 1 | 11.660 | 0.364 | 1.77250 | 49.6 |
| 2 | 3.274 | 1.637 | — | — |
| 3* | −8.060 | 2.485 | 1.49176 | 57.4 |
| 4* | 3.032 | 3.046 | — | — |
| 5 | −11.339 | 0.655 | 1.84666 | 23.8 |
| 6 | −3.881 | 0.546 | — | — |
| diaphragm | ∞ | 2.417 | — | — |
| 7 | 28.148 | 0.327 | 1.84666 | 23.8 |
| 8 | 3.022 | 1.455 | 1.51633 | 64.1 |
| 9 | −4.790 | 0.036 | — | — |
| 10 | 4.000 | 0.327 | 1.84666 | 23.8 |
| 11 | 2.425 | 1.637 | 1.77250 | 49.6 |
| 12 | −11.318 | 0.000 | — | — |
| 13 | ∞ | 0.437 | 1.51633 | 64.1 |
| 14 | ∞ | 2.501 | — | — |
| 15 | ∞ | — | — | — |

*designates an aspherical surface with rotation symmetry around the optical axis.
Aspherical Data:
No.3: K = 0.00, A4 = 0.30330 × $10^{-1}$, A6 = −0.43125 × $10^{-2}$, A8 = 0.46329 × $10^{-3}$, A10 = −0.24092 × $10^{-4}$
No.4: K = 0.00, A4 = 0.50708 × $10^{-1}$, A6 = −0.52255 × $10^{-2}$, A8 = 0.34087 × $10^{-2}$, A10 = −0.73846 × $10^{-3}$

TABLE 6

| Distance from optical axis | Surface figure | Paraxial spherical amount | Aspherical amount |
|---|---|---|---|
| 0.00000 | 0.000000 | 0.000000 | 0.000000 |
| 0.10000 | −0.000618 | −0.000620 | 0.000002 |
| 0.20000 | −0.002449 | −0.002482 | 0.000033 |
| 0.30000 | −0.005421 | −0.005585 | 0.000164 |
| 0.40000 | −0.009418 | −0.009932 | 0.000514 |
| 0.50000 | −0.014283 | −0.015524 | 0.001241 |
| 0.60000 | −0.019826 | −0.022364 | 0.002538 |
| 0.70000 | −0.025827 | −0.030455 | 0.004627 |
| 0.80000 | −0.032049 | −0.039801 | 0.007751 |
| 0.90000 | −0.038241 | −0.050406 | 0.012164 |
| 1.00000 | −0.044148 | −0.062275 | 0.018127 |
| 1.10000 | −0.049517 | −0.075415 | 0.025898 |
| 1.20000 | −0.054104 | −0.089831 | 0.035726 |
| 1.30000 | −0.057680 | −0.105530 | 0.047849 |
| 1.40000 | −0.060032 | −0.122519 | 0.062488 |
| 1.50000 | −0.060962 | −0.140808 | 0.079846 |
| 1.60000 | −0.060294 | −0.160405 | 0.100111 |
| 1.70000 | −0.057864 | −0.181320 | 0.123456 |
| 1.80000 | −0.053523 | −0.203563 | 0.150040 |
| 1.90000 | −0.047133 | −0.227146 | 0.180013 |
| 2.00000 | −0.038568 | −0.252081 | 0.213513 |
| 2.10000 | −0.027713 | −0.278381 | 0.250668 |
| 2.20000 | −0.014479 | −0.306059 | 0.291580 |
| 2.30000 | 0.001185 | −0.335131 | 0.336316 |
| 2.40000 | 0.019254 | −0.365612 | 0.384866 |
| 2.50000 | 0.039585 | −0.397520 | 0.437105 |
| 2.60000 | 0.061843 | −0.430872 | 0.492715 |
| 2.70000 | 0.085399 | −0.465686 | 0.551085 |

<Embodiment 4>

Figure 16:
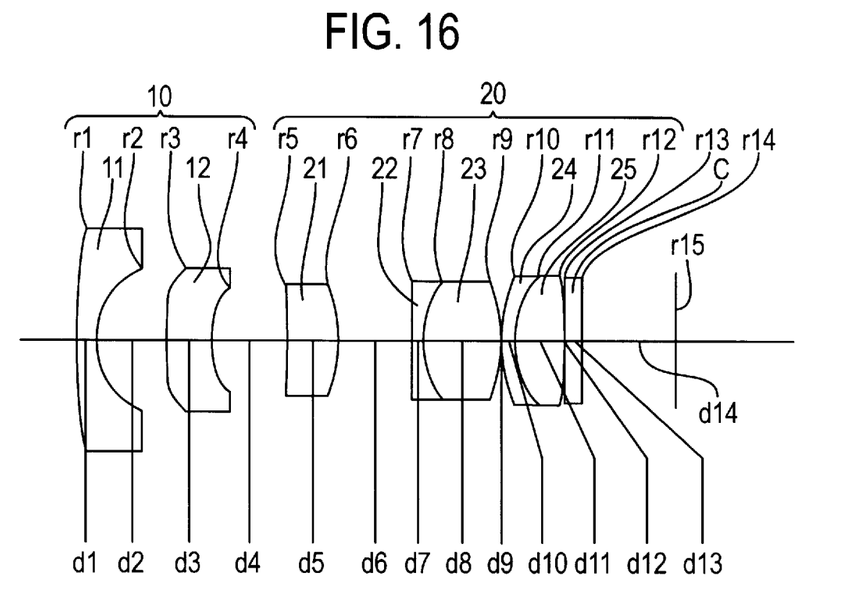
FIG. 16 is a schematic view showing the lens arrangement of a fourth embodiment of a super wide angle lens system, according to the present invention.
Figure 17:
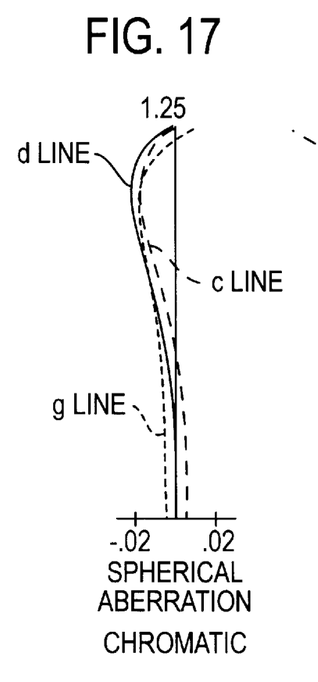
FIG. 17 shows diagrams of chromatic aberrations represented by spherical aberrations, in the super wide angle lens system shown in FIG. 16.
Figure 18:
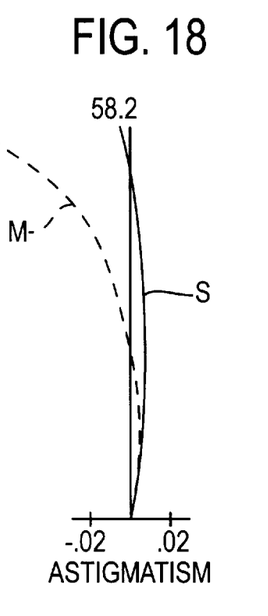
FIG. 18 shows astigmatism diagrams of the super wide angle lens system shown in FIG. 16.
Figure 19:
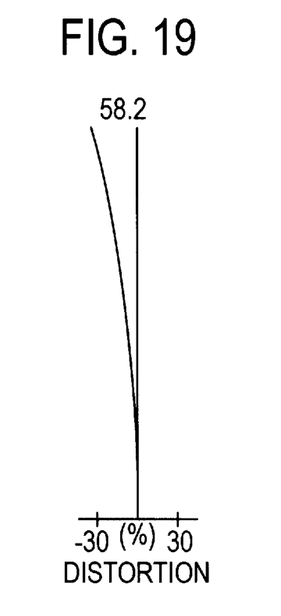
FIG. 19 shows distortion diagrams of the super wide angle lens system shown in FIG. 16.
Figure 20A:
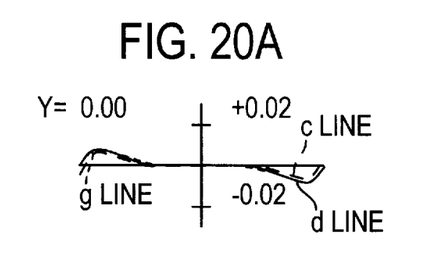
FIG. 20 shows coma diagrams of the super wide angle lens system shown in FIG. 16 at each angle of view.
Figure 20B:
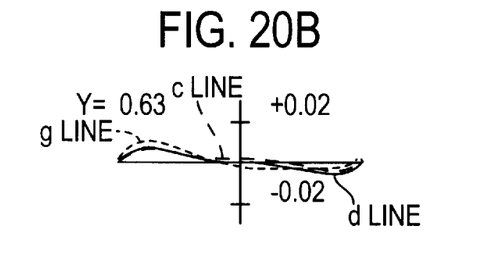
Figure 20C:
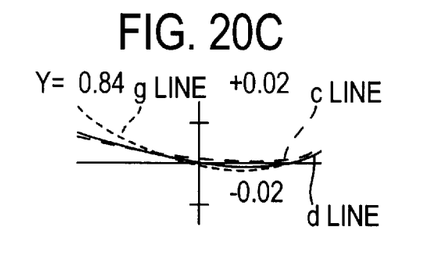
Figure 20D:
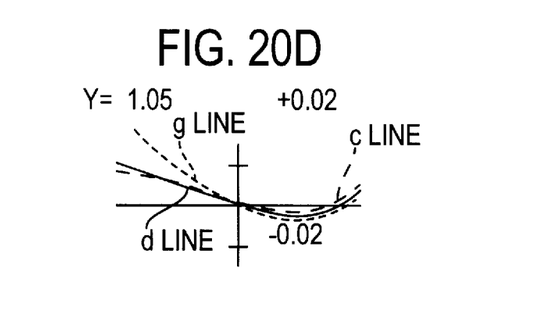

FIG. 16 shows a fourth embodiment of a super wide angle lens system according to the present invention. The basic structure of the lens system of the fourth embodiment is substantially the same as that of the second embodiment. Numerical data regarding the fourth embodiment is shown in Table 7 below. The surface figure, paraxial spherical amount and aspherical amount of surface No. 3 are shown in Table 8 below. FIGS. 17 through 20 show aberration diagrams of the lens system of the fourth embodiment.

TABLE 7

FNO = 1:1.3
f = 1.00
W = 58.1
fB = 2.90 (=0.422/1.51633 + 2.622)

| Surface No. | R | D | Nd | vd |
|---|---|---|---|---|
| 1 | 17.000 | 0.500 | 1.77250 | 49.6 |
| 2 | 2.016 | 1.793 | — | — |
| 3* | −10.108 | 1.149 | 1.49176 | 57.4 |
| 4* | 6.008 | 1.950 | — | — |
| 5 | −16.636 | 1.300 | 1.84666 | 23.8 |
| 6 | −3.553 | 1.880 | — | — |
| 7 | 95.609 | 0.300 | 1.84666 | 23.8 |
| 8 | 2.691 | 2.000 | 1.51633 | 64.1 |
| 9 | −3.867 | 0.030 | — | — |
| 10 | 4.862 | 0.300 | 1.84666 | 23.8 |
| 11 | 2.512 | 1.300 | 1.77250 | 49.6 |
| 12 | −8.951 | 0.000 | — | — |
| 13 | ∞ | 0.422 | 1.51633 | 64.1 |
| 14 | ∞ | 2.622 | — | — |
| 15 | ∞ | — | — | — |

*designates an aspherical surface with rotation symmetry around the optical axis.
Aspherical Data:
No.3: K = 0.00, A4 = 0.88810 × $10^{-1}$, A6 = −0.27110 × $10^{-1}$, A8 = 0.79690 × $10^{-2}$, A10 = −0.61180 × $10^{-3}$
No.4: K = 0.00, A4 = 0.11720, A6 = −0.48970 × $10^{-1}$, A8 = 0.25560 × $10^{-1}$, A10 = −0.13970 × $10^{-2}$

TABLE 8

| Distance from optical axis | Surface figure | Paraxial spherical amount | Aspherical amount |
|---|---|---|---|
| 0.00000 | 0.000000 | 0.000000 | 0.000000 |
| 0.10000 | −0.000618 | −0.000620 | 0.000002 |
| 0.20000 | −0.002449 | −0.002482 | 0.000033 |
| 0.30000 | −0.005421 | −0.005585 | 0.000164 |
| 0.40000 | −0.009418 | −0.009932 | 0.000514 |
| 0.50000 | −0.014283 | −0.015524 | 0.001241 |
| 0.60000 | −0.019826 | −0.022364 | 0.002538 |
| 0.70000 | −0.025827 | −0.030455 | 0.004627 |
| 0.80000 | −0.032049 | −0.039801 | 0.007751 |
| 0.90000 | −0.038241 | −0.050406 | 0.012164 |
| 1.00000 | −0.044148 | −0.062275 | 0.018127 |
| 1.10000 | −0.049517 | −0.075415 | 0.025898 |
| 1.20000 | −0.054104 | −0.089831 | 0.035726 |
| 1.30000 | −0.057680 | −0.105530 | 0.047849 |
| 1.40000 | −0.060032 | −0.122519 | 0.062488 |
| 1.50000 | −0.060962 | −0.140808 | 0.079846 |
| 1.60000 | −0.060294 | −0.160405 | 0.100111 |
| 1.70000 | −0.057864 | −0.181320 | 0.123456 |
| 1.80000 | −0.053523 | −0.203563 | 0.150040 |

Values of the ratios defined in conditions (1) through (8) for the four embodiments are shown in Table 9 below.

TABLE 9

| | Embodiment 1 | Embodiment 2 |
|---|---|---|
| Condition (1) | −7.296 | −6.981 |
| Condition (2) | 4.1500 × $10^{-2}$ | 3.0330 × $10^{-2}$ |
| Condition (3) | −7.2169 × $10^{-3}$ | −4.3125 × $10^{-3}$ |
| Condition (4) | 1.0529 × $10^{-3}$ | 4.6329 × $10^{-4}$ |
| Condition (5) | 2.549 | 2.907 |
| Condition (6) | 2.400 | 2.479 |
| Condition (7) | 529.729 | 25.228 |
| Condition (8) | 4.118 | 4.178 |

TABLE 9-continued

|  | Embodiment 3 | Embodiment 4 |
|---|---|---|
| Condition (1) | −8.060 | −10.108 |
| Condition (2) | $2.0485 \times 10^{-2}$ | $8.8810 \times 10^{-2}$ |
| Condition (3) | $-2.5925 \times 10^{-3}$ | $-2.7110 \times 10^{-2}$ |
| Condition (4) | $2.4634 \times 10^{-4}$ | $7.9690 \times 10^{-3}$ |
| Condition (5) | 3.022 | 2.691 |
| Condition (6) | 2.425 | 2.512 |
| Condition (7) | 27.255 | 25.229 |
| Condition (8) | 4.229 | 4.543 |

According to the present invention, a super wide angle lens system having an angle of view of approximately 120° to 140° and an F-number of approximately 1.2 to 1.4 and in which the aberrations can be effectively compensated can be provided.

What is claimed is:

1. A retrofocus type super wide angle lens system comprising a front lens group of negative power and a rear lens group of positive power, arranged in this order form an object side, wherein said front lens group comprises a negative meniscus first lens element having a convex surface facing said object side and a second lens element having at least one aspherical surface, arranged in this order from said object side, said second lens element being shaped so as to form a biconcave lens in a vicinity of the optical axis of said second lens element and to form a negative meniscus lens having a convex surface facing said object side at a peripheral portion of said second lens element;

wherein a surface of said second lens element located on said object side is made of an aspherical surface and satisfies the following conditions:

$-12 \leq R_3/f \leq -6$ $2.0 \times 10^{-2} \leq A_4/f^3 \leq 1.0 \times 10^{-1}$ $-3.0 \times 10^{-2} \leq A_6/f^5 \leq -2.0 \times 10^{-3}$ $2.0 \times 10^{-4} \leq A_8/f^7 \leq 1.0 \times 10^{-2}$ wherein $R_3$ represents radius of curvature of the paraxial spherical surface of said aspherical surface of said second lens element, $A_4$ represents fourth-order aspherical factor of said aspherical surface of said second lens element, $A_6$ represents sixth-order aspherical factor of said aspherical surface of said second lens element, $A_8$ represents eighth-order aspherical factor of said aspherical surface of said second lens element, and f represents focal length of the whole lens system.

2. The super wide angle lens system according to claim 1, wherein said rear lens group comprises at least a single lens element and a diaphragm arranged in this order from said object side.

3. The super wide angle lens system according to claim 2, wherein said rear lens group comprises two pairs of cemented lenses, each pair having a positive lens element and a negative lens element cemented thereto, located behind said diaphragm in this order from said object side.

4. The super wide angle lens system according to claim 1, wherein said second lens element is provided with opposed aspherical surfaces.

5. The super wide angle lens system according to claim 1, wherein a boundary portion between said biconcave lens portion of said aspherical second lens element in said vicinity of said optical axis and said peripheral negative meniscus lens portion thereof is located substantially on a peripheral portion of an axial bundle defined by an F-number.

6. The super wide angle lens system according to claim 1, wherein said rear lens group comprises a positive single lens, a diaphragm and two pairs of cemented lenses, each pair having a positive lens element and a negative lens element cemented thereto, arranged in this order from said object side.

7. A retrofocus type super wide angle lens system comprising a front lens group of negative power and a rear lens group of positive power, arranged in this order from an object side, wherein said front lens group comprises a negative meniscus first lens element having a convex surface facing said object side and a second lens element having at least one aspherical surface, arranged in this order from said object side, said second lens element being shaped so as to form a biconcave lens in a vicinity of the optical axis of said second lens element and to form a negative meniscus lens having a convex surface facing said object side at a peripheral portion;

wherein said front lens group comprises a negative meniscus first lens element having a convex surface facing said object side and a second lens element having at least one aspherical surface, arranged in this order from said object side, said rear lens group comprising a positive single third lens, a diaphragm, a cemented lens assembly having a negative fourth lens element and a positive fifth lens element cemented thereto, and another cemented lens assembly having a negative sixth lens element and a positive seventh lens element cemented thereto, said optical elements being arranged in this order from said object side, and wherein said lens system satisfies the following conditions:

$2.50 \leq R_8/f \leq 3.10$ $2.35 \leq R_{11}/f \leq 2.55$ $14 \leq f_{7-9}$ $4 \leq f_{10-12} \leq 5$ wherein $R_8$ represents a radius of curvature of the surface of said fourth lens element on said image side, $R_{11}$ represents a radius of curvature of the surface of said sixth lens element on said image side, $f_{7-9}$ represents a resultant focal length of said fourth and fifth lens elements, $f_{10-12}$ represents a resultant focal length of said sixth and seventh lens elements, and f represents a focal length of the entire lens system.

8. The super wide angle lens system according to claim 7, wherein said third lens element comprises a positive meniscus lens having a convex surface on an image side, said fourth lens element comprises a negative lens with a concave surface on said image side, said fifth lens element comprises a positive biconvex lens, said sixth lens element comprises a negative meniscus lens with a convex surface on said object side, and said seventh lens element comprises a positive biconvex lens.

9. The super wide angle lens according to claim 7, said second lens element including opposed aspherical surfaces.

10. The super wide angle lens system according to claim 7, wherein a boundary portion between said biconcave lens portion of said second lens element and said peripheral negative meniscus lens portion of said second lens element is located substantially on a peripheral portion of an axial bundle defined by an F-number.

* * * * *

UNITED STATES PATENT AND TRADEMARK OFFICE
CERTIFICATE OF CORRECTION

PATENT NO. : 5,861,999
DATED : January 19, 1999
INVENTOR(S) : E. TADA

It is certified that error appears in the above-identified patent and that said Letters Patent is hereby corrected as shown below:

On the title page, item [54] and column 1:

"ANGEL" should be --ANGLE--.

At column 11, line 21 (claim 1, line 3) of the printed patent, "form" should be ---from---.

Signed and Sealed this

Twenty-eighth Day of December, 1999

Attest:

Q. TODD DICKINSON

*Attesting Officer*    *Acting Commissioner of Patents and Trademarks*